US007860875B2

(12) United States Patent
Bird et al.

(10) Patent No.: US 7,860,875 B2
(45) Date of Patent: Dec. 28, 2010

(54) METHOD FOR MODIFYING A QUERY BY USE OF AN EXTERNAL SYSTEM FOR MANAGING ASSIGNMENT OF USER AND DATA CLASSIFICATIONS

(75) Inventors: Paul Miller Bird, Markham (CA); Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 10/855,106

(22) Filed: May 26, 2004

(65) Prior Publication Data

US 2005/0267865 A1      Dec. 1, 2005

(51) Int. Cl.
  *G06F 17/30*      (2006.01)
  *G06F 21/24*      (2006.01)
(52) U.S. Cl. .................. 707/759; 707/769; 707/783
(58) Field of Classification Search ............. 707/1–10, 707/100–104.1
  See application file for complete search history.

(56) References Cited

U.S. PATENT DOCUMENTS

| 5,787,428 | A    |    | 7/1998  | Hart ........................ 707/9    |
| 6,487,552 | B1   | *  | 11/2002 | Lei et al. ................... 707/4   |
| 6,578,037 | B1   | *  | 6/2003  | Wong et al. ................ 707/10    |
| 6,581,060 | B1   |    | 6/2003  | Choy ........................ 707/9    |
| 2003/0154401 | A1 |    | 8/2003  | Hartman et al. ............ 713/201  |
| 2003/0236782 | A1 | *  | 12/2003 | Wong et al. ................ 707/5   |
| 2004/0139043 | A1 | *  | 7/2004  | Lei et al. ................... 707/1  |
| 2005/0165799 | A1 | *  | 7/2005  | Wong ........................ 707/100 |

OTHER PUBLICATIONS

Karjoth, G., *Access Control with IBM Tivoli Access Manager*, ACM Transactions on Information and System Security, vol. 6, No. 2, May 2003, pp. 232-257.
DeFazio, S., et al., *Integrating IR and RDBMS Using Cooperative Indexing*, SIGIR '95 Seattle WA, 1995 ACM 0-89791-714-6/95, pp. 84-92.
Winslett, et al., *Formal Query Languages for Secure Relational Databases*, ACM Transactions on Database Systems, vol. 19, No. 4., Dec. 1994, pp. 626-662.
Sandhu, R., *Access Control: Principles and Practice*, IEEE Communications Magazine, Sep. 1994, pp. 40-48.

* cited by examiner

*Primary Examiner*—Tim T. Vo
*Assistant Examiner*—Sangwoo Ahn
(74) *Attorney, Agent, or Firm*—Sughrue Mion, PLLC

(57) ABSTRACT

Disclosed is a data processing-implemented method, a data processing system, and an article of manufacture for modifying a query during compilation of the query. The query includes a request for an element of data from a table in a database and parameters identifying the requested element. The data processing-implemented method includes determining available information from parameters for locating a classification of the requested element and a classification associated with the query, the requested data classification controlling access to the requested element according to the query associated classification, requesting a suggested action from an external system for obtaining a comparison of the requested data classification and the query associated classification based on the available information, receiving the suggested action from the external system responsive to the sent request, and incorporating the suggested action into the query, the suggested action effecting comparison of the requested data classification with the query associated classification.

14 Claims, 3 Drawing Sheets

METHOD FOR MODIFYING A QUERY BY USE OF AN EXTERNAL SYSTEM FOR MANAGING ASSIGNMENT OF USER AND DATA CLASSIFICATIONS

FIELD OF THE INVENTION

The present invention relates to the field of database management systems, and more specifically, to a system, method and a computer program product for modifying a query by use of an external system for managing assignment of user and data classifications.

BACKGROUND

Information can be obtained from tables in a database using queries expressed in a database query language, such as Structured Query Language (SQL). The query is translated into an internal representation by a compiler of a database management system. This internal representation is interpreted by a runtime processor of the database management system to execute the query. Access to information in the database may be controlled according to a classification of both the tables and the user attempting to access the tables. For example, a user can only gain access to a specific table if the user's classification is such that access to the specific table is permitted based on the table's classification. The table's classification may be based on the entire table or on individual elements in each table (e.g. rows) with elements being classified to provide access to elements and not the entire table. The additional classifications produce complexities in classification management and tracking which may be governed by a system external to the database management system.

Compilers use various optimization techniques to minimize the time and computer resources used for execution of the internal representation of the query. The compiler determines an efficient access plan to satisfy the query by examining table information and related statistics. Controlling access to elements based on user and table classifications may involve integrating with an external system. Such integration during execution of the query often increases execution time, especially if such information is not readily available.

SUMMARY

In accordance with one aspect there is provided a data processing-implemented method for directing a data processing system to modify a query during compilation of the query, the query including a request for an element of data from a table in a database and parameters identifying the requested element, the data processing-implemented method including determining available information from parameters for locating a classification of the requested element and a classification associated with the query, the requested data classification controlling access to the requested element according to the query associated classification, requesting a suggested action from an external system for obtaining a comparison of the requested data classification and the query associated classification based on the available information, receiving the suggested action from the external system responsive to the sent request, and incorporating the suggested action into the query, the suggested action effecting comparison of the requested data classification with the query associated classification.

In accordance with another aspect there is provided a data processing system for modifying a query during compilation of the query, the query including a request for an element of data from a table in a database and parameters identifying the requested element, the data processing system including a query analysis mechanism for determining available information from parameters for locating a classification of the requested element and a classification associated with the query, the requested data classification controlling access to the requested element according to the query associated classification, a request mechanism for preparing a request to the external system, the request asking the external system to provide a suggested action for obtaining a comparison of the requested data classification and the query associated classification, the request comprising the available information, an external system interface for requesting a suggested action from an external system for obtaining a comparison of the requested data classification and the query associated classification based on the available information, and receiving the suggested action from the external system responsive to the sent request, and a modification mechanism for incorporating the suggested action into the query to effect comparison of the requested data classification with the query associated classification.

In accordance with a further aspect there is provided an article of manufacture for directing a data processing system to modify a query during compilation of the query, the query including a request for an element of data from a table in a database and parameters identifying the requested element, the article of manufacture including a program usable medium embodying one or more executable data processing system instructions, the executable data processing system instructions including executable data processing system instructions for determining available information from parameters for locating a classification of the requested element and a classification associated with the query, the requested data classification controlling access to the requested element according to the query associated classification, executable data processing system instructions for requesting a suggested action from an external system for obtaining a comparison of the requested data classifications and the query associated classification based on the available information, executable data processing system instructions for receiving the suggested action from the external system responsive to the sent request, and executable data processing system instructions for incorporating the suggested action into the query, the suggested action effecting comparison of the requested data classification with the query associated classification.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION OF EMBODIMENTS

The following detailed description of the embodiments do not limit the implementation of the embodiments to any particular computer programming language. The computer program product may be implemented in any computer programming language provided that the operating system provides the facilities that support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
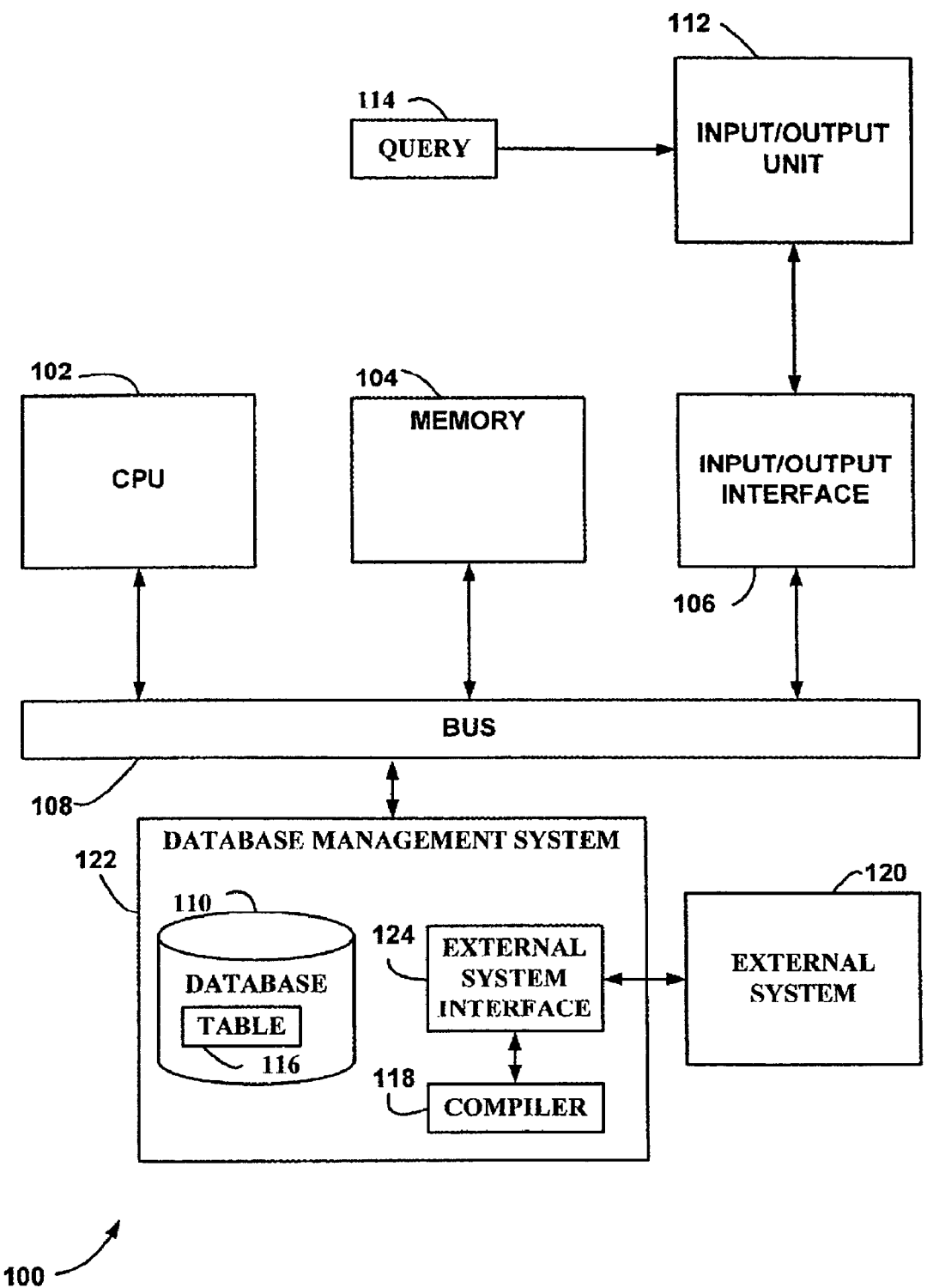
FIG. 1 is an exemplary computing environment in which a database management system (DBMS) may be actualized.

FIG. 1 illustrates a configuration of a computing environment 100 comprising a data processing system 126 in which an embodiment of a database management system 122 may be implemented.

The data processing system 126 includes a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112 in the computing environment 100.

The CPU 102 can be a commercially available CPU or a customized CPU suitable for operations described herein. Other variations of the CPU 102 can include a plurality of CPUs interconnected to coordinate various operations and functions. The data processing system 126 serves as an apparatus for performing the present method by the CPU 102 executing the present invention.

Data and instructions that are to be executed by the CPU 102 reside in the memory 104. The memory 104 contains a database management system (DBMS) 122 and a database 110 with multiple tables 116 (only one table is shown for illustration purposes) that hold information. The instructions are internal representations of programs that run on the data processing system 126, such as the database management system 122. The programs operate on the data. For example, if the program is the database management system 122, the data can be rows in the table 116. The database management system 122 comprises a compiler 118 and an external system interface 124. The database management system 122 retains an indication of operating conditions, such as an identifier for the user who submitted the query 114, when compiling and executing the query 114.

The information in the tables 116 may be accessed by a query 114 that is received by the input/output unit 112 and is retained in the memory 104. The query 114 may be presented in an SQL format that is compiled by the compiler 118 to form an internal representation that is interpreted for execution. The present invention may be embodied in the compiler 118. Alternatively, the present invention may be provided as an extension of the functionality of the compiler 118. The present invention may be embodied in a program stored in, for example, the memory 104. Alternatively, the present invention may be recorded on any type of recording medium such as a magnetic disk or an optical disk. The present invention recorded on such a recording medium is loaded to the memory 104 of the data processing system 126 via the input/output unit 112 (e.g. a disk drive).

The compiler 118 recognizes statements in the query 114 including keywords that represent commands and relevant arguments. During the formation of the internal representation from the query 114, the compiler 118 modifies the query 114 to improve performance during execution.

The external system interface 124 is in communication with an external system 120 while modifying the query 114 to improve performance. The external system 120 may be a system external to the database management system 122 but residing in the data processing system 126 or it may be external to the data processing system 126. In the latercase the external system 120 may communicate with the data processing system 126 via a direct link or through a communications network.

The external system 120 manages the assignment of classifications to users and sections of data in the tables 116. For example, given a user identification and a table name, the external system 120 knows how to obtain the classification of that user. The external system 120 contains a classification that is associated with the query 114 which may be a classification for a user identification from which the query 114 was submitted, a classification of the location from which the query 114 was submitted or some other such similar classification basis. The external system 120 may also contain access rules that govern when a user with a particular classification can access an element from the table 116. An interface in the external system 120 accepts questions from the compiler 118 providing available information and desired information. Through this interface the external system 120 is able to either provide the information requested by the compiler 118 or provide a course of action for obtaining the information.

As a result, the query 114 may be modified to include information on a user's classification or table classification or a comparison of the two classifications. Such information might be determined by interfacing with the external system 120 during execution or such interfacing may be performed in advance by the compiler 118 and the results incorporated into the query 114.

Figure 2:
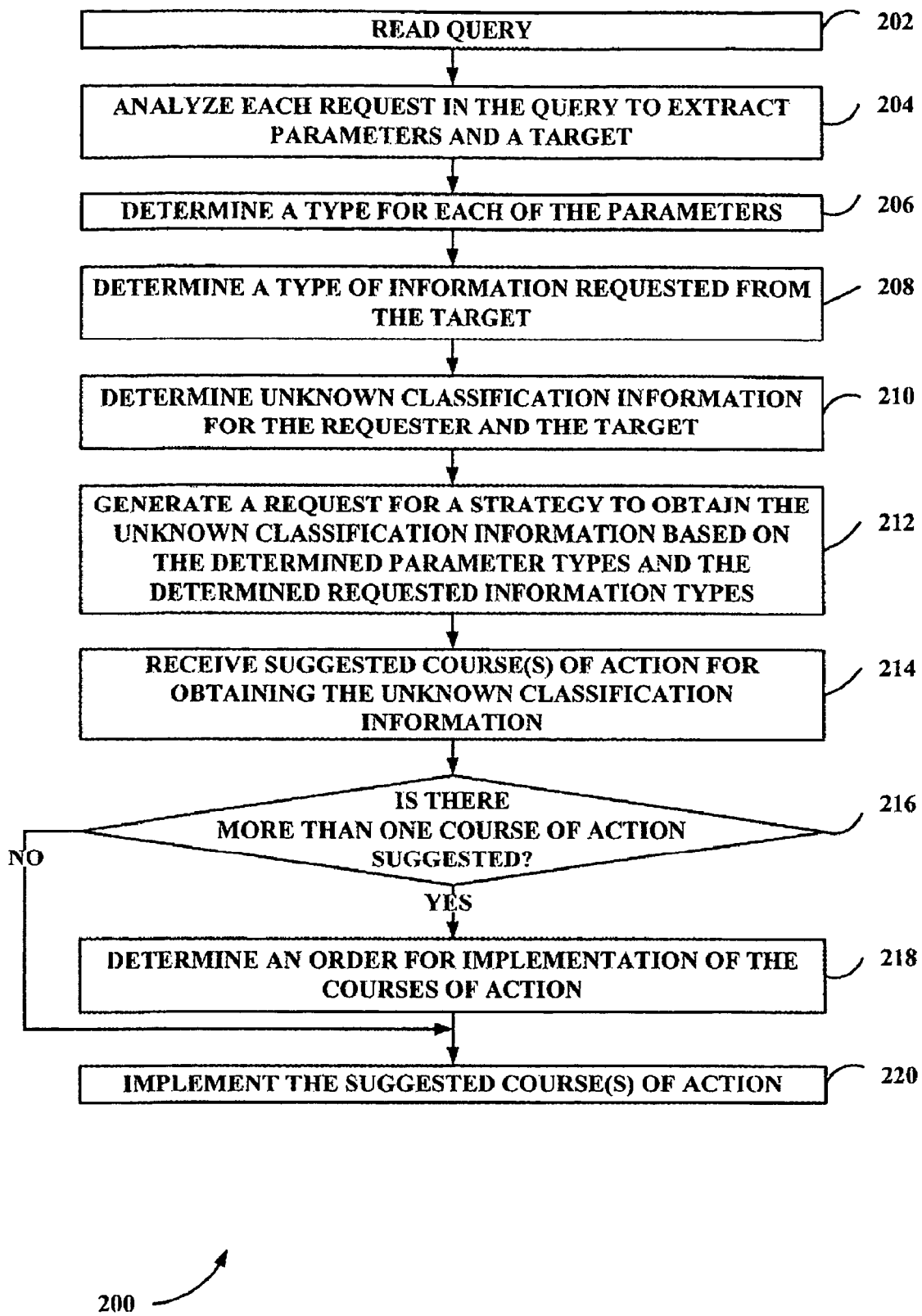
FIG. 2 illustrates operations of a compiler of the DBMS of FIG. 1 for modifying a query based on information from an external system.

FIG. 2 illustrates operations of the compiler 118 that modify the query 114 based on information from the external system 120. The query 114, containing at least one request for information, is read in step 202. Each request is analyzed in step 204 to extract parameters of the request and a target of the request. The type of information of each of the parameters is determined in step 206. The parameters may also include an identification associated with the query 114 such as a user who submitted the query 114 or a location of the submission. The type of information requested from the target is determined in step 208.

The table 116 in the database 110 contains information that is classified. In order for a user who submitted the query 114 to obtain the requested information from the table 116, access rules for the table 116 in the external system 120 might indicate that the user have a classification that corresponds to the classification of the requested information. Based on the types of parameters included in the request, the user's identification (as contained in the database management system 122) and the type of information requested, step 210 determines what information regarding the user's classification and the information's classification is unknown.

Since this unknown classification information is determined prior to completing execution of the query 114, the compiler 118 determines how the classification information can be determined in conjunction with the external system 120. A request for a strategy to obtain the unknown classification information is generated in step 212. This request is based on the determined types of the parameters and the determined type of the requested information.

Suggested course(s) of action for obtaining the unknown classification information are received in step 214 from the external system 120. If there are multiple types of unknown classification information then there may be multiple courses of action that will be received. Each course of action received may be directed to obtaining one of the types of unknown classification information.

If there is more than one course of action received, as determined in step 216, then an order for the courses of action is determined in step 218. This order may depend on information required by each course of action. For example, if one course of action uses information dependent on a second course of action then the second course of action is implemented first. The order for implementation of the courses of action may optionally be supplied with the suggested courses of action The course(s) of action are inserted into the query in step 220 such that they can be easily implemented during execution.

Figure 3:
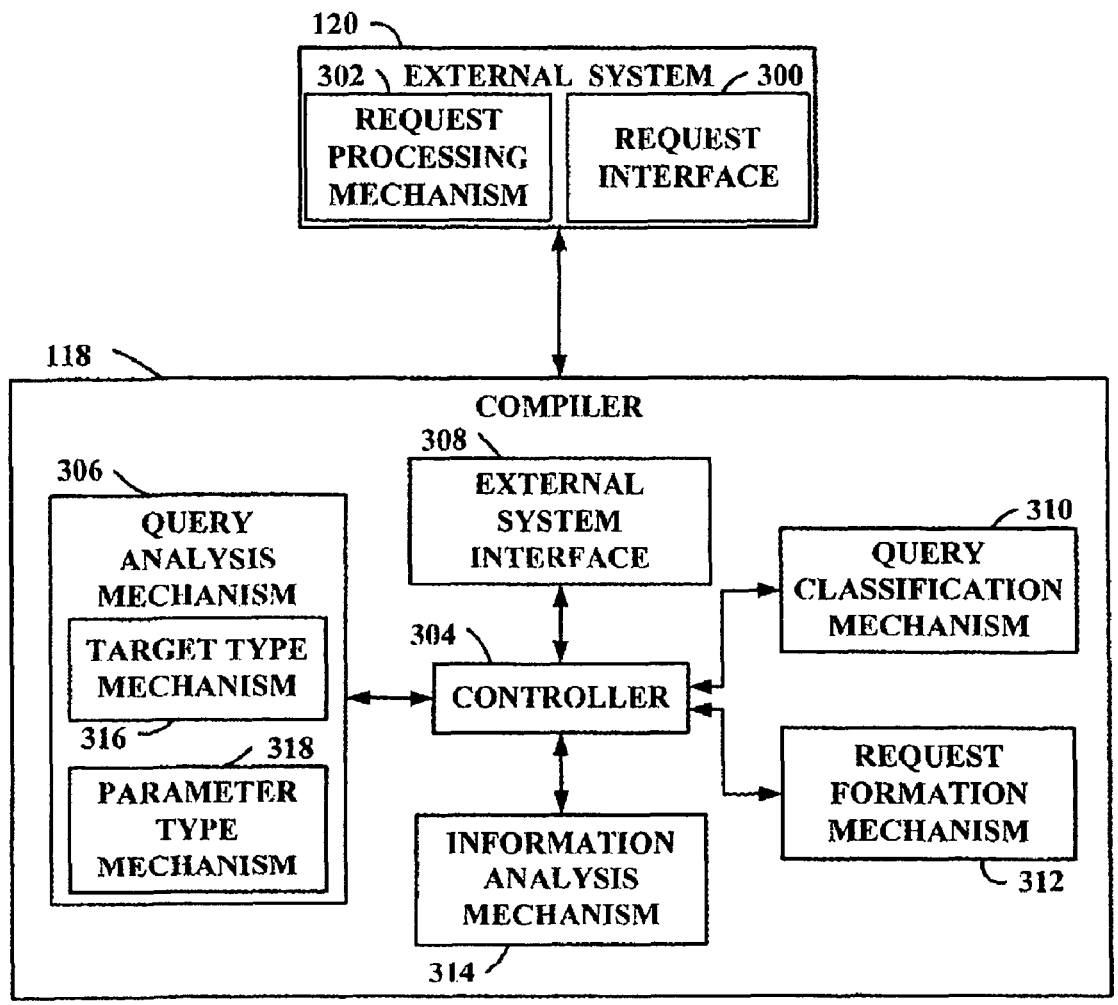
FIG. 3 illustrates functional components of the compiler in the DBMS of FIG. 1 for modifying a query based on information from the external system.

FIG. 3 illustrates functional components of the compiler 118 in the DBMS 122 for modifying the query 114 based on information from the external system 120. The external system 120 includes a request interface 300 and a request processing mechanism 302. The compiler 118 includes a controller 304 in communication with a query analysis mechanism 306, a management interface 308, an information analysis mechanism 314, a query classification mechanism 310 and a request formation mechanism 312.

The controller 304 in the compiler 118 manages compiling the query 114 in order to form an internal representation thereof. During compiling, the controller 304 coordinates modification of the query 114 to improve execution performance. When the controller 304 detects a request in the query 114 that requires a check of a user's classification with the classification of requested information, the request is provided to the query analysis mechanism 306.

The query analysis mechanism 306 includes a target type mechanism 316 and a parameter type mechanism 318 that collectively function to determine the information defining the request and the information sought from the request. The parameter type mechanism 318 extracts the type of information of the parameters that define the request. The target type mechanism 316 determines the type of information that has been requested. The query analysis mechanism 306 provides the parameters and target types to the controller 304 where it is passed to the information analysis mechanism 314 and the request formation mechanism 312.

The information analysis mechanism 314 receives the parameters and target types and assesses what information is available for determining the requested information classification and user's classification. Based on the available information, the information analysis mechanism 314 determines the information that is unknown that is to be used for completing data access qualification for the user. The determined unknown information is provided to the controller 314 from which it is passed to the request formation mechanism 312.

The request formation mechanism 312 receives the parameters and target types as well as an indication of the unknown information to be used in determining the requested information classification and user's classification. The request formation mechanism 312 formulates a request on how to obtain the unknown information based on the parameters and target types. This request is provided to the controller 304 to be passed to the management interface 308. The external system interface 308 provides the request to the external system interface 124 in the database management system 122 so that the request can be submitted to the external system 120.

The request from the request formation mechanism 312 may be one or a combination of, for example:
- Q1: Given an user identification and a table name, how can the user classification be obtained?
- Q2: Given a set of data values and a table name, how can the element classification be obtained?
- Q3: Given a user classification and an element classification, how can the two be compared?

The request interface 300 of the external system 120 receives the request from the compiler 118. The request is provided to the request processing mechanism 302 where a knowledge base may be drawn upon to produce suggestions regarding the manner in which the unknown information can be obtained. If there are multiple courses of action then the suggestion may involve multiple courses of action, each pertaining to obtaining a different piece of unknown information. The suggestions from the request processing mechanism 302 are provided to the controller 304 via the request interface 300 and the management interface 308 through the external system interface 124.

Based on the above exemplary requests, the suggested course(s) of action form the request processing mechanism 302 may be one or a combination of, for example:
- A1: A subquery which can be used to select a user classification or element classification from a table in the database 110 known to the external system 120.
- A2: A predicate which can be used to filter out the table's elements (rows or columns) that have a classification that do not match the user's classification.
- A3: A set of values presented directly or indirectly via a session variable or special register. These values can represent a set of user classification or a set or element classifications.
- A4: A query which can be used to generate an internal mapping table for use by the executable form of the query 114. For a given table, the mapping table enables identification of the classification of an element in the table. For example, the mapping table may consist of (n+1) columns where the first n columns represent the table columns from which to derive the element classifications and the last columns represents a classification level. When such a mapping table was not previously created, an internal mapping table for use by the executable form of the query 114 can be generated for this purpose.
- A5: A request to call the external system at execution time of the query 114 for classification information.

The above requests may produce the suggested course(s) of action as indicated below:

Action on Q1:
- A1: A subquery that can be used to select the user classification for the user identification from a database table known to the external system 120.
- A3: A data value(s) that indicates the user classification for the user identification.
- A5: An indication that the external system 120 should be asked for this information at execution time.

Action on Q2:
- A1: A subquery that can be used to select the element classification for the current element from a mapping table known to the external system 120.
- A4: A query that can be used to generate an internal mapping table for use by the executable form of the query 114.

A5: An indication that the external system 120 should be asked for this information at execution time.

Action on Q3:

A2: A predicate that the compiler 118 can add to the query 114 to filter out the table's elements that do not match the user's classification. The general form of predicates returned will be an IN predicate but inequality predicates are also possible, particularly if the element classification or user's classification represent a hierarchy. This type of advice is most likely to be returned when the element classification is stored within the table itself or when a mapping table has been created. If the element classification is stored within the element then the predicate will refer to the table's column where the element classification level is stored, otherwise, the predicate will refer to the mapping table's column where the classification level is stored.

A3: A set of values representing the element classification allowed for the given user's classification. Element level access control may then be enforced by, for example:
1. The compiler 118 altering the query 114 to add a predicate using the set of values received. This choice is possible if the element classification is stored within the table itself or a mapping table has been created.
2. If the element classification is not stored within the table and a mapping table has not been created then a predicate cannot be used. In this case, interaction between the DBMS 122 and the external system 120 is used during execution of the query 114 to enforce element access control. For each element accessed, the data in the set of columns defining the element classification and the full table is submitted to the external system 120 with the result being the element classification. The result is compared against the set of values for the given user classification to determine if the element can be viewed or altered by that user. To reduce the number of times the DBMS 122 makes a call to the external system 120 to obtain the element classification a caching technique may be used. For example, the information that could be stored in the cache may be the full table name, the data defining the element classification and the element classification as returned by the external system 120.

A5: An indication that the external system 120 should be asked for this information at execution time.

The request provided by the request processing mechanism 302 may also provide an indication of whether or not the suggested course(s) of action can be used of all users or only for a provided user identification.

The controller 304 provides the suggested course(s) of action to the query classification mechanism 310 where an order is determined for the course(s) of action based on dependence of the results of each course of action. Alternatively, this order may be specified by the external system 120 and received with the suggested course(s) of action. After the order has been determined, the query classification mechanism 310 modifies the query 114 to include the course(s) of action.

The following are examples of modifying an SQL query to include obtaining classification information.

A table T1 (C1, C2, C3, . . . , Cn) represents a table where the classification level of an element and the user classification is an element of the ordered set S={TOP SECRET, SECRET, CONFIDENTIAL, CLASSIFIED, UNCLASSIFIED}. The element level access control policy for this example states that an element with a classification r can be viewed by a user with a classification u only if u>=r. Suppose that a user with a classification level 'CONFIDENTIAL' issues a query SELECT * FROM T1.

Scenario 1

The compiler 118 sends a request corresponding with Q1 from above to the external system 120 to obtain the user's classification. Suppose the external system 120 provides a suggested course of action corresponding with A3 from above; that is, a data value representing the user's classification. The compiler 118 then submits a second request to the external system 120 based on Q3 above by submitting the table name (T1) and the user's classification (CONFIDENTIAL). Suppose the external system 120 returns a suggested course of action corresponding with A2 from above. That is, in response to the second request the external system 120 returned a predicate in, for example, "C1 IN ('CONFIDENTIAL', 'CLASSIFIED', 'UNCLASSIFIED')". Based on the received courses of action the compiler 118 modifies the query 114 to incorporate the predicate providing a query such as

SELECT * FROM T1 WHERE C1 IN ('CONFIDENTIAL', 'CLASSIFIED', 'UNCLASSIFIED').

Given that the set is ordered and represents a hierarchy, the predicate returned could also be "C1>'CONFIDENTIAL'".

Scenario 2

Suppose an element classification is determined based on the values in columns C1 and C2 as follows:

| C1 | C2 | Element Classification |
|----|----|------------------------|
| 1  | 1  | TOP SECRET             |
| 2  | 2  | SECRET                 |
| 3  | 3  | CONFIDENTIAL           |
| 4  | 4  | CLASSIFIED             |
| 5  | 5  | UNCLASSIFIED           |

The compiler 118 sends the external system 120 a request corresponding with request Q1 to obtain the user's classification. Suppose the suggest course of action is A3; that is, a data value represent the user's classification. The compiler 118 submits a second request based on the table name (T1) and the set of column names defined in the classification mapping shown above (Cl and C2). The suggested course of action in response to the second request depends on whether a mapping table exists.

Response 1: A Mapping Table Exists

A database table (T1MAP) storing mapping information has been created and is known to the external system 120. T1MAP consists of three columns, namely, C1, C2 and LEVEL. For each pair of values (C1, C2), the LEVEL column indicates an element classification. Based on this information, the external system 120 can return A1 as the suggested course of action; that is, a subquery to select an element classification from T1MAP. The subquery would be as follows:

SELECT LEVEL FROM T1MAP WHERE T1MAP.C1=T1.C1 AND T1MAP.2=T1.C1.

The compiler 118 then sends a request to the external system 120 corresponding with request Q3 by submitting the table name (T1) and the user's classification (CONFIDENTIAL). If the external system 120 returns suggested action A2, then the predicate returned would be: "T1MAP.LEVEL>'CONFIDENTIAL'". Based on the suggested course of action the compiler 118 modifies the query 114 to incorporate the predicate and subquery. The modified query would be:

```
SELECT * FROM T1, T1MAP WHERE
    (T1.C1=T1MAP.C1 AND T1.C2=T1MAP.C2)
    AND (T1MAP.LEVEL> 'CONFIDENTIAL').
```

Response 2: A Mapping Table Does Not Exist

If a mapping table does not exist then the suggested course of action provided to the compiler 118 might be action A5, an indication to submit the same request during execution. The second request submitted by the compiler 118 corresponds with request Q3 and submits the table name (T1) and the user's classification (CONFIDENTIAL). The external system may provide action A3, a set of data values representing the element classifications allowed for the user (i.e. all elements having 'CONFIDENTIAL', 'CLASSIFIED', and 'UNCLASSIFIED'). Based on the suggestion course of action the compiler 118 does not modify the query 114 but inserts logic into the internal representation to perform the following tasks:

For each element obtained, call the external system 120 by submitting the table name (T1) and the values (C1,C2).
  Obtain the element classification from the call to the external system 120.
  If the element classification is an element of the set {'CONFIDENTIAL', 'CLASSIFIED', 'UNCLASSIFIED'} then include the element in the result set; otherwise, discard the element.

Although the classification of the user is used as the basis for obtaining the requested element of data, any classification associated with the query 114 may be used. Such other associated classifications may include a classification of the location from which the query 114 was submitted.

The elements of data that are accessed may be the rows of the tables 116 or the columns of the tables 116 or some other delineation of portions of the tables 116.

It will be appreciated that the elements described above may be adapted for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A data processing-implemented method for directing a data processing system to modify a query during compilation of the query, the query comprising a request for an element of data from a table in a database and parameters identifying the requested element, the data processing-implemented method comprising:
  determining, by a computer, available information from parameters for locating a classification of the requested element and a classification associated with the query, the requested data classification controlling access to the requested element according to the query associated classification;
  requesting a suggested action from an external system for obtaining a comparison of the requested data classification and the query associated classification based on the available information;
  receiving the suggested action from the external system responsive to the sent request; and
  incorporating the suggested action into the query, the suggested action effecting comparison of the requested data classification with the query associated classification,
  wherein if the external system knows the requested data classification and the query associated classification, the suggested action is provided prior to execution of the query, and comprises at least one of the requested data classification, the query associated classification, a course of action for obtaining the requested data classification, a course of action for obtaining the query associated classification, and a comparison of the requested data classification and the query associated classification, and
  wherein if the external system does not know the requested data classification and the query associated classification, the suggested action comprises a request to call the external system at execution time of the query.

2. The data processing-implemented method according to claim 1 wherein the requesting the suggested action comprises:
  determining unknown information used to obtain a comparison of the requested data classification with the query associated classification; and
  sending a request to the external system for the suggested action, the suggested action pertaining to obtaining the unknown information.

3. The data processing-implemented method according to claim 1 wherein the requesting the suggested action comprises:
  selecting a request from one of a plurality of formulated requests based on the available information; and
  sending the selected request to the external system to obtain the suggested action.

4. The method according to claim 3 wherein the selecting comprises:
  selecting the request from the plurality of formulated requests consisting of:
    a request for the query associated classification based on providing an identifier for the table and an identifier associated with the query, and
    a request for the requested data classification based on providing an identifier for the requested element and the table identifier, and a request for a comparison of the requested data classification with the query associated classification.

5. The data processing-implemented method according to claim 2 wherein the incorporating the suggested action comprises:
  incorporating a subquery into the query to obtain unknown information from a table.

6. The method according to claim 1 wherein the incorporating the suggested action comprises:
  incorporating a predicate into the query to delimit sections of the table that can be obtained by the query according to the requested data classification and the query associated classification.

7. The data processing-implemented method according to claim 1 wherein the incorporating the suggested action comprises any one of:
  incorporating a set of values into the query representing the unknown information;
  incorporating a second query into the query to generate a mapping table mapping classifications to elements of data in the table; and incorporating a request to the external system to be sent during execution of the query.

8. The data processing-implemented method according to claim 1 wherein the comparison comprises:
comparing the data classification with the query associated classification comprising the suggested action and determining if the query associated classification is equal to or greater than the data classification.

9. The data processing-implemented method for directing a data processing system according to claim 1, wherein the external system is external to and functions independently from the data processing system, and communicates with the data processing system through a communications network.

10. The data processing-implemented method for directing a data processing system according to claim 1,
wherein the external system contains classification information and access rules that govern access to data according to a particular classification, and
wherein the external system is separate of the data processing system.

11. The data processing-implemented method according to claim 1, wherein the query associated classification is based on a classification of a user submitting the query, and the requested data classification is based on a permission level of a user authorized to view the requested data.

12. The data processing-implemented method according to claim 11, wherein the suggested action includes at least one of instructions for obtaining the requested data classification when the requested data classification cannot be obtained with information in the query, and instructions for obtaining the query associated classification when the query associated classification cannot be obtained with information in the query.

13. The data processing-implemented method according to claim 12, wherein the requested data classification is obtained using the instructions for obtaining the requested data classification, and the query associated classification is obtained using the instructions for obtaining the query associated classification and are provided for the comparison of the obtained requested data classification with the obtained query associated classification.

14. The data processing-implemented method according to claim 1, wherein when the external system is called at the execution time of the query, the query is modified during execution of the query.

* * * * *